United States Patent [19]

Yuhasz et al.

[11] Patent Number: 4,563,592
[45] Date of Patent: Jan. 7, 1986

[54] WALL BOX DIMMER SWITCH WITH PLURAL REMOTE CONTROL SWITCHES

[75] Inventors: Stephen J. Yuhasz, Zionsville; David G. Luchaco, Macungie, both of Pa.

[73] Assignee: Lutron Electronics Co. Inc., Coopersburg, Pa.

[21] Appl. No.: 541,368

[22] Filed: Oct. 13, 1983

[51] Int. Cl.⁴ .................................................. H01H 47/00
[52] U.S. Cl. .................................... 307/115; 307/140; 323/905; 315/291; 361/160
[58] Field of Search ............................... 307/112–115, 307/132 E, 140, 116; 315/291, DIG. 4; 323/905; 338/179

[56] References Cited

U.S. PATENT DOCUMENTS

| | | | |
|---|---|---|---|
| Re. 26,119 | 12/1966 | Slater | 323/905 X |
| 3,300,711 | 1/1967 | Duncan | 323/905 X |
| 3,430,101 | 2/1969 | Biltz | 323/905 X |
| 3,558,902 | 1/1971 | Casey | 307/114 X |
| 3,684,919 | 8/1972 | Cramer | 315/DIG. 4 X |
| 3,697,821 | 10/1972 | Johnson | 307/115 X |
| 3,746,923 | 7/1973 | Spira et al. | 338/179 X |
| 4,259,619 | 3/1981 | Wall | 307/115 X |
| 4,334,171 | 6/1982 | Parman et al. | 315/291 X |
| 4,367,510 | 1/1983 | Watanable | 307/114 X |

FOREIGN PATENT DOCUMENTS

| | | |
|---|---|---|
| 0036666 | 9/1981 | European Pat. Off. . |
| WO79/00087 | 2/1979 | PCT Int'l Appl. . |
| WO80/02083 | 2/1980 | PCT Int'l Appl. . |
| 1467974 | 3/1977 | United Kingdom . |
| 1473094 | 5/1977 | United Kingdom . |
| 2008870 | 6/1979 | United Kingdom . |
| 2013426 | 8/1979 | United Kingdom . |
| 2021751 | 12/1979 | United Kingdom . |
| 2133643 | 7/1984 | United Kingdom . |

Primary Examiner—A. D. Pellinen
Assistant Examiner—Derek S. Jennings
Attorney, Agent, or Firm—Ostrolenk, Faber, Gerb & Soffen

[57] ABSTRACT

A dimmer switch and dimmer system is described in which dimming for the entire system is controlled from a single device while on/off switching is controlled by individual devices at multiple locations. The main dimming device contains an alternate action switching circuit for opening and closing the gate circuit of a controllably conductive device. Each of the remote location switching devices consists of respective low voltage switches, each operable to operate the alternate action switching circuit in the main dimmer device and are connected thereto by wiring which carries only signal level voltages and currents. Each remote switch may be a wall-mounted switch containing a single, relatively large area push button which momentarily closes a short movement, low activation force pair of contacts when the large area push button is depressed by pressure applied to any portion over its surface.

27 Claims, 19 Drawing Figures

_FIG.13_

_FIG.11_

_FIG.12_

_FIG.14_

WALL BOX DIMMER SWITCH WITH PLURAL REMOTE CONTROL SWITCHES

BACKGROUND OF THE INVENTION

This invention relates to a dimmer switch system, and more specifically relates to a novel dimmer switch which can be used in combination with multiple-location remote switching devices.

Switching devices which are operable from a plurality of locations to cause switching of a given incandescent lamp load are well known. Such devices commonly employ combinations of three-way and four-way switches which are connected in series with one another such that the operation of any of the switches will reverse the energization state of the load between an on or off state. Dimmer structures may be connected in series with the switching circuit. Devices of this type are sold, for example, by the Lutron Electronics Co., Inc., the assignee of the present invention under the trademark "Skylark". The dimming structure may be combined with a series single pole, double throw switch and the assembly is adapted to be mounted on a wall box. A linearly movable slide is provided for adjusting the dimming power level. Individual series connected three-way and four-way switches may then be used with this assembly to provide for remote turn-on and turn-off of the load.

In switching systems of this type, there is provided single location dimming with multiple location switching. However, all switch contacts at all locations must be rated to carry full load current and, moreover, all wiring must be rated to carry full load current. For example, No. 12 wire is commonly used for installations which carry from 15 to 20 amperes load current. Also, a minimum of three wires is required at each remote switch location.

A second multiple location switching and dimming system is known which employs a plurality of remotely located touch plates at a plurality of respective remote locations. Each of the touch plates will control turn-on or turn-off of a common dimming circuit and will control the dimming level. Devices of this type have numerous disadvantages. For example, they require bare skin contact with the touch plates for actuation of the dimmer circuit. Moreover, there is no tactile feedback upon actuation. Another disadvantage of these systems is the need to wait for a given light level to be reached when changing from one level to another. Also, there is no indication of the light level setting when the lights are off. Such systems are also sensitive to a-c wiring polarity and loss of the previous on/off status and dimming level if the a-c supply fails. There also appears to be a limit on the number of touch plates which can be used in a given system and a limit to the distance between the touch plates and the main dimmer circuit. A serious disadvantage of such systems is that the touch plate wiring cannot be near load wiring so that existing three-way wiring in a residential or commercial installation cannot be used for the touch plate system.

Low voltage latching relay switching systems are known, which use momentary contact push buttons to energize or deenergize a latching power relay which switches the load current. This system requires three wires to each control location, plus a separate power supply and latching relay.

BRIEF DESCRIPTION OF THE INVENTION

In accordance with the invention, a novel dimmer switch and a novel dimming system which can be used with the dimmer switch is provided to permit remote switching of the circuit under control of the dimmer device from a plurality of remote locations.

The novel dimming switch structure can employ the basic structure shown in U.S. Pat. No. 3,746,923, dated July 17, 1973, entitled "DIMMER SWITCH WITH LINEARLY MOVABLE CONTROL", in the names of Joel S. Spira and Joseph Licata, and assigned to the assignee of the present invention. That structure, however, is modified such that the gate circuit for controlling the firing of the controllably conductive device within the dimming structure is provided with an auxiliary electronic or mechanical switching circuitry contained within the dimmer switch.

The switch structure of the above patent is further modified to contain a momentary close push button which, when closed, causes a switching circuit, for example, a magnetic latching relay, to operate to cause a change in state of the switch in the gate circuit of the controllably conductive device. Thus, by depressing the small push button switch in the main dimmer structure the gate circuit is alternatively enabled or disabled, thus turning on or turning off the circuit being controlled by the dimmer. Note that when the controlled circuit is turned on, it is at the dimming level set by the dimmer control which can be a linear or a rotatable potentiometer or the like.

Simple remote switches which are low voltage and low current switches may then be mounted in remote locations and all contain relatively inexpensive momentary push button switches connected in circuit relationship with the auxiliary switching circuitry of the main dimmer. Depression of any of these remote switches will energize the auxiliary switching circuitry and cause a change in state of the switch in the gate control circuit of the controllably conductive device within the main dimmer structure. These switches can be electrically connected to the main dimmer structure over signal level wiring. Moreover, the existing wiring of an existing three-way system can be employed as the low voltage wiring of the novel system of the invention.

A further feature of the invention consists of the structure of the remote switches. Since the remote switch does not carry full line current, it can consist of the very simple switching structure which can be actuated by very light pressure. Accordingly, the switch structure can have any desired ornamental configuration not always possible with conventional wall-mounted switches. Thus, the operating mechanism for the switch preferably consists of a large area push button which, when pressed at any location on its surface, can move the necessary short distance to cause the operation of the internal switching device. This system also produces a tactile feedback since the user will hear and feel a mechanical shock or "click" upon the actuation of the remote switching device. The remote switching device can consist of well-known microswitches, which are short travel, light activation force momentary switches.

The novel system of the invention has the following advantageous features:

(1) Dimming control takes place at only a single location, but switching, independent of the dimming control, can take place from any of a plurality of locations.

(2) The use of a latching relay in the auxiliary switching circuitry in the dimming control system will maintain the "on" or "off" status of the load even if the power supply fails, so that the load will be energized when the power supply system is reinstated, if it was energized at the time of the failure.

(3) The control leads throughout the entire system carry only signal level currents and, therefore, are inherently safer than systems in which all wiring carries full load current.

(4) The momentary switches employed in the system of the invention carry only signal level currents and, therefore, can be short throw, light activation force devices which give tactile feedback to the user.

(5) There is no restriction in the present system on the number of remote switches which can be used, or on the distance of the remote switches to the main dimmer switch.

(6) There is no restriction in the present invention on control lead placement, so that existing three-way wiring can be used, if desired, when installing the present invention in place of an existing three-way system.

(7) The user of the system of the invention will have a tactile feedback when operating a remote switch, and will have visual indication of the light setting level even when the system is off. This setting indication is provided by the adjustment member, such as a linearly movable adjusting member in the preferred embodiment or a rotational adjustable member or any other type of adjustment which is employed. The system operation is thus "user-friendly" and its operation is apparent to users who are unfamiliar with the system.

(8) A-c polarity considerations need not be observed during installation. Moreover, the system is insensitive to extraneous noise and can be easily protected against wiring mistakes by the use of positive temperature coefficient resistors in series with the momentary push-button switches.

(9) The system is compatible with a wide variety of possible actuators, including touch plates and various forms of remote control, such as infrared, ultrasonic or radio frequency systems.

(10) Only two wires are required to the remote switches.

The system of the invention is specifically advantageous over the prior art Skylark type of device described above in that all of the remote switches of the Skylark type of system had to carry full load curent and, therefore, could not be short travel, light actuating force devices. Similarly, all of the wiring used for the Skylark type of device had to carry full load current and typically had to be No. 12 wire. An inherent improvement in safety comes about with the new system due to the use of fewer high current wires.

Specific advantages of the present system over the prior art touch plate type of actuated system described above are that dimming and switching are obtained from independent controls. Consequently, it is not necessary to wait for a given light level to be reached; the dimmer control indicates light level even when the switch is off; and the device is self-teaching and thus more user-friendly. The system of the invention does not require bare skin actuation; provides tactile feedback from the remote switches; is insensitive to noise or a-c line polarity; can use existing three-way wiring; is unlimited in the number of remote switches or their distance from the main dimmer; and system status is retained even though there is a failure in the a-c supply.

Specific advantages of the invention over prior art low voltage latching relay switching systems are that the invention requires only two wires at each remote location (rather than three wires), and the components serving the power supply and load switching function are contained in the same wall-box as the main switching device. Therefore, mounting of separate devices and the necessary wiring between them as required in prior art latching relay switching systems is not necesary and the system of the invention can easily be installed in existing three-way installations.

The novel system of the invention can also be employed in energy-saving switching systems which use a hidden dimmer but permit light actuation from any of a plurality of locations. Thus, light can normally be dimmed, for example, to 85% of full value for energy saving purposes. Users of the system can turn lights on and off, but do not have ready access to the hidden dimming control. Multiple switching systems for control of multiple loads is also possible. In such multiple systems, suitable diode logic is employed in order to steer remote closing switches to predetermined controls of the various loads. For example, in a system in which the scene consists of three independent loads controlled by three respective dimmer switches, there can be provided eight remote switches which can be operated in varying combinations in order to control the various loads. For example, operation of three of the remote switches can control only load 1. Operation of a fourth and fifth of the switches can control only the second load and operation of the sixth switch can control only the third load. Operation of the seventh switch can control all three loads simultaneously while operation of the eighth switch controls only two of the loads. Clearly, other combinations of switching can be employed.

While the invention can be carried out with single momentary push-button controls which turn power alternately on and off when depressed, two momentary contacts can be used, one for only turning the unit on and the other for only turning the unit off. Such control can be used throughout or can be superimposed on the systems previously described to provide a "panic" on or blackout function. Such control simplifies the circuit of the unit since relay steering and capacitive storage components can be eliminated, but the system requires three wires at each switch point.

DETAILED DESCRIPTION OF THE DRAWINGS

Figure 1:
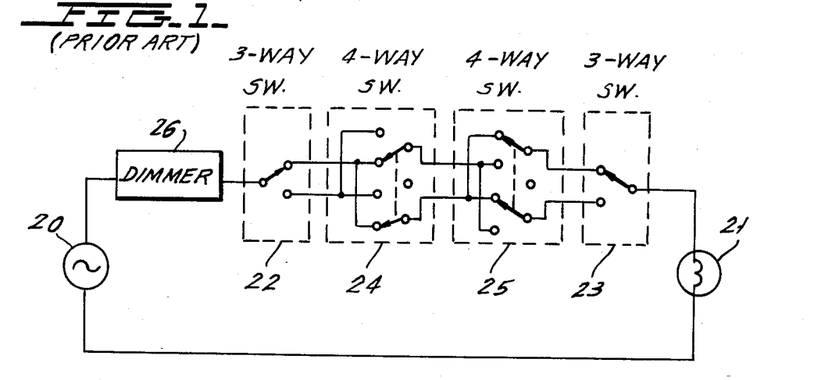
FIG. 1 is a schematic diagram of a prior art system such as the Skylark system previously described.

Referring first to FIG. 1, there is shown therein a well-known switching system which provides single location dimming and multiple location switching. There is provided in FIG. 1 a conventional power supply 20 for energizing a load 21 which typically may be an incandescent lamp load. The switching system shown includes two three-way switches 22 and 23, each of which is a single pole, two position switch. Also provided are two four-way switches 24 and 25 which are two pole, two position switches. A single dimmer structure 26 is also provided. The dimmer structure 26 can be a dimmer structure per se or can be built into one of the three-way switches 22 or 23.

The operation of the system of FIG. 1 is such that a change of position of the movable contacts of any of switches 22 through 25 will cause a change in state of energization of load 21. Thus, if the load has been energized or deenergized, the operation of any one of the switches will cause its deenergization or energization, respectively. Moreover, the energization of load 21 will take place at the same dim level which has been set by the dimmer structure 26.

Each of switches 22 through 25 can be mounted at various remote locations, but it will be apparent that all switch contacts must carry full load current and all wiring must carry full load current.

Figure 2:
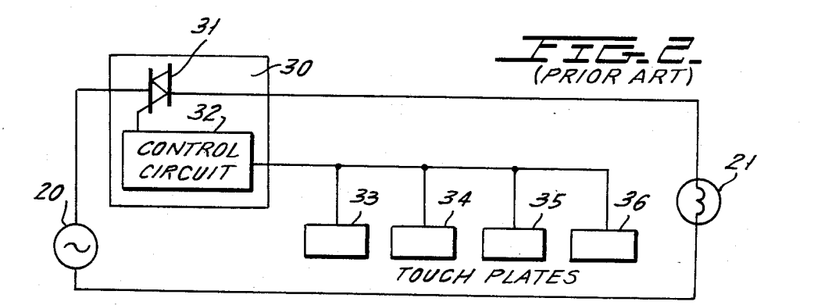
FIG. 2 is a schematic diagram of a prior art switching system employing remotely located touch plates.

Another prior art dimmer system is shown in FIG. 2 which provides multiple location switching and dimming. In the circuit of FIG. 2, there is provided the same power supply 20 and load 21 which are connected in series through a dimmer circuit 30 which can, for example, have a thyristor 31 which is phase-controlled by a conventional control circuit 32. Control circuit 32 is, in turn, controlled by the application of a control signal from a plurality of remotely located touch plates 33 to 36, which are conventional capacitive touch plates which are operated by the application of an operator's finger to the plate. The thyristor 31 is turned on and off, and will change dimming level so long as the operator's finger remains on any touch plate 33 to 36.

The system of FIG. 2 has the advantage over the system of FIG. 1 of not requiring full load current rated contacts and the wiring from the touch plates need only be low voltage control wiring. However, the system of FIG. 2 has numerous disadvantages over that of FIG. 1. For example, the system requires bare skin contact for actuation and does not provide tactile feedback upon actuation of any of the remote location touch pads. It is also necessary to wait for a given light level to be reached after touching a touch pad and there is no indication of the level setting when the lights are off. Systems of the type of FIG. 2 may be sensitive to a-c wiring polarity and will lose previous status if the a-c power supply fails. A serious disadvantage of the system of FIG. 2 is that the touch pad wiring cannot be near load wiring so that existing three-way wiring cannot be used for the installation of the device. Finally, it is known that there is a limit on the number of touch pads or touch plates which are used and a limit to the distance between the plates and the control circuit 32.

Figure 2A:
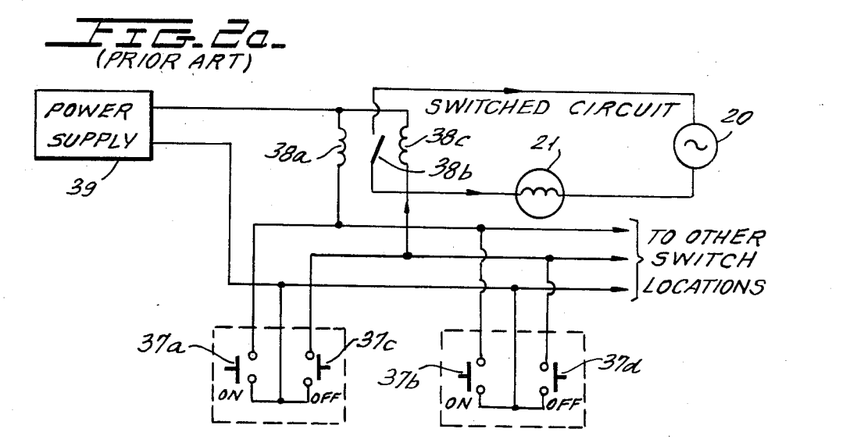
FIG. 2a is a schematic diagram of a prior art latching relay system.

FIG. 2a shows a prior art low voltage latching relay switching system which uses momentary contact pushbuttons 37a and 37b, which energize "on" coil 38a of a relay containing main switching contact 38b. Momentary contacts 37c and 37d, at the different remote locations shown, will operate "off" coil 38c of the latching relay. A separate power supply 39 is needed to apply power to coils 38a and 38b depending on the operation of switches 37a, 37b, 37c and 37d or similar switches at other remote locations.

The system of FIG. 2a requires three wires, as shown, to each control point location, plus the separate power supply 39 and the separate latching relay. As will be shown, the system of the invention requires only two wires at each remote switch location. Moreover, the power supply and load switching function are contained in the same wall-box as the main switching device. Therefore, mounting of separate devices and wiring between them is not required. Thus, the invention can be installed in existing three-way installations while the low voltage latching relay system of FIG. 2a cannot be used as a replacement for an existing three-way installation.

Figure 3:
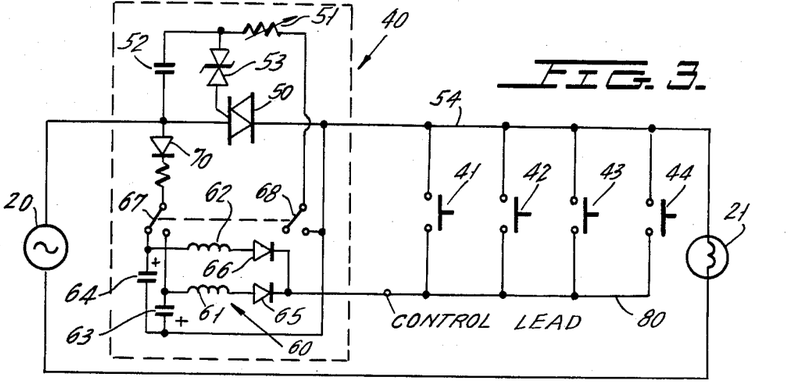
FIG. 3 is a circuit diagram which illustrates the basic principles of the present invention.

FIG. 3 schematically illustrates the novel dimmer switch and dimmer system of the present invention. There is shown in FIG. 3 the power supply 20 and load 21 which is to be energized thereby. In the arrangement of FIG. 3, however, a novel dimmer switch device 40 is provided along with any desired number of low voltage (compared to the load voltage) remote momentary contacts 41 through 44 which can be located at respective remote locations.

The main switching and dimming device 40 consists of the triac 50 which is fired at a phase angle determined by the adjustment of the adjustment potentiometer 51 which is connected in circuit relationship with a capacitor 52 and a conventional firing diac 53. Triac 50 is connected directly in series with power supply 20 and load 21. Other controllably conductive devices such as anti-parallel connected thyristors or power transistors can be used in place of triac 50 without departing from the present invention.

For the phase control circuit to be operative, the right-hand side of adjustable resistor 51 should be connected to the power lead 54 leading to the load 21. In the position shown in FIG. 3, the control circuit is disconnected from the power lead 54 so that the switching system is off. This is controlled in a novel manner in accordance with the invention by a latching relay 60 which consists of a set coil 61 and a reset coil 62. Coils 61 and 62 of the relay operate in conjunction with capacitors 63 and 64, respectively, and diodes 65 and 66, respectively. The relay further contains contacts 67 and 68 which are electrically operated by coils 61 and 62 such that the contacts are in the position shown when coil 61 has been pulsed. The contacts are placed in the opposite position upon the pulsing of reset coil 62.

Capacitor 63 or capacitor 64 is charged from the diode 70 depending upon the position of single pole, double throw switch 67. Thus, capacitor 64 is charged when switch 67 is in the position shown and capacitor 63 is charged when switch 67 is operated to its other position.

With the contacts 67 and 68 of the latching relay in the position shown in FIG. 3, the momentary closure of any of contacts 41, 42, 43 or 44 will cause capacitor 64 to discharge through and energize coil 62. This will then cause contact 68 to move to its other position in FIG. 3, thus placing the phase control circuit in an operative position and permitting the supply 20 to energize load 21 at an intensity determined by the setting of potentiometer 51. Upon the next momentary closure of any of contacts 41 to 44, the set coil 61 will be energized by the charged capacitor 63, thus causing a reversal of the position of switches 67 and 68 to the position shown in FIG. 3, thus turning off the power applied to the load 21.

Figure 3A:
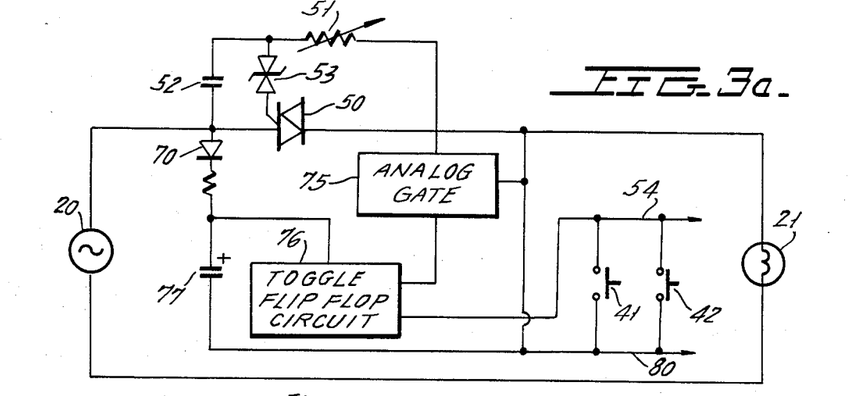
FIGS. 3a and 3b show modifications of the circuit of FIG. 3.

FIG. 3a shows an alternative circuit to FIG. 3, employing an electronic latch rather than an electromagnetic latch. Thus, an analog gate circuit 75 takes the place of relay contact 68 and an electronic toggle type flip-flop circuit 76 replaces the latching relay function. Both these devices are well known in the art. The flip-flop 76 derives its power from the diode 70 and capacitor 77 supply. Actuation of any of the remote switches 41, 42 causes the flip-flop 76 to "toggle" to its complementary output state. This causes the analog gate 75 to either apply or remove gate drive from the power switching circuit and thereby activate or deactivate the load circuit 21.

It will be observed that the novel circuit of FIG. 3 permits independence between a switching operation and the dimming control. Thus, switching can be accomplished from any of the remote locations containing switches 41 to 44 while dimming control is obtained at a central location through adjustment of the dimming control 51. Moreover, the latching relay structure maintains the previously set status of the energization of load 21 if the power supply is somehow interrupted and is later re-established. Significantly, the control lead 80 connected from the remote switches 41 to 44 to the node between diodes 65 and 66 carries only signal level power and, therefore, can be very small wire which is inherently safer and less expensive than the heavy wire and current needed in the installation of the type shown in FIG. 1. Also, only two wires are needed at each remote switching location, instead of three, as was previously required. It is possible, however, that existing three-way wire can be used if desired since there is no restriction on the placement of the control lead, as in prior art systems of the type shown in FIG. 2.

Since the momentary switches 41 to 44 carry only signal level power, they can be short throw, light actuation force devices which will still provide tactile feedback. For example, the switches can consist of conventional microswitches housed as will be later described so that they can be actuated by pressing on any point of a relatively wide switch plate.

Since the switches 41 to 44 are air gap switches, there is virtually no restriction on the number of parallel switches which can be used or their distance from the main dimmer structure 40. During the installation of the device, it will also be observed that a-c supply polarity is unimportant and the system can be easily protected against miswiring as will be later described.

Figure 3B:
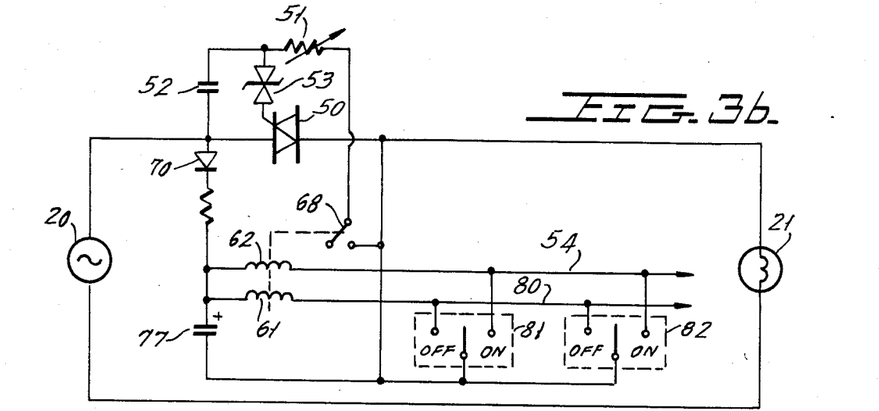

FIG. 3b shows a variation of the circuits of FIGS. 3 and 3a which uses two double-throw momentary contact push-button switches 81 and 82 having one switch position always forcing the unit to the "on" state and the other causing the unit to go "off", in a manner similar to the operation of the prior art low voltage latching relay system. Such a configuration could be used, for example, in the multiple switching system described above to provide a "panic on" function to force all lights to the on condition in certain situations, or a "blackout" function, if needed. Note that this type of control results in a simpler main unit, since the relay steering contact is no longer required and one of the storage capacitors can be eliminated. However, the system of FIG. 3b requires three wires at each remote switch point, as does the low voltage latching relay scheme.

The novel system of FIG. 3 can be employed in various combinations and can, for example, be used as an energy-saving switching system which employs a hidden control dimmer plus multiple physically accessible switches. The dimmer setting can, for example, be set at 85% of full intensity in order to save energy and to extend lamp life. The dimmer setting is not easily disturbed by unauthorized persons since it is hidden but on/off switches, consisting of an unlimited number of short travel, light actuating force remote switch devices are at a plurality of locations.

Figure 4:
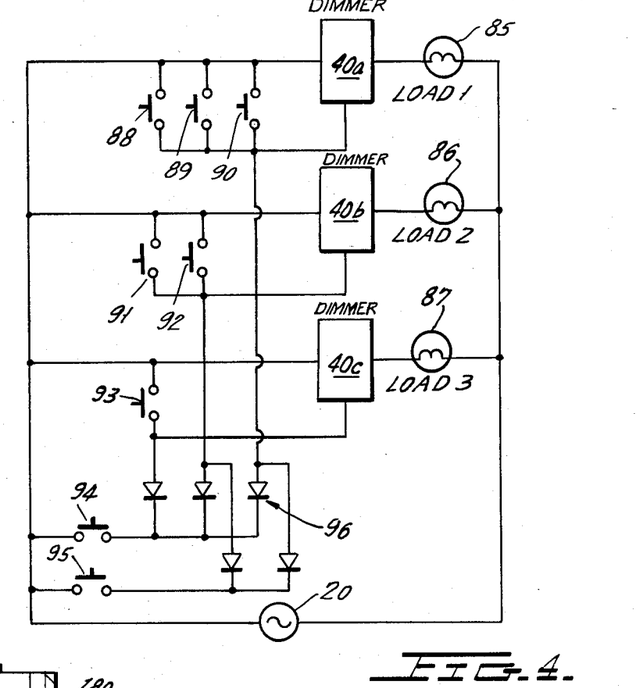
FIG. 4 schematically illustrates the connection of a plurality of systems, each similar to that of FIG. 3, for controlling a plurality of loads employed for a master switching system.

The device can also be assembled with a plurality of sub-systems to form a system such as that shown in FIG. 4, which is a master switching system having multiple location switching of independent dimmers or groups of dimmers from one switch with appropriate diode logic. For example, a particular lighting scene can consist of three independent loads 85, 86 and 87 energized from the common power supply 20. A plurality of dimmer switches, such as the three dimmer switches 40a, 40b and 40c, each having the structure identical to switch 40 of FIG. 3, are provided for each of loads 85, 86 and 87, respectively. A plurality of remote switches are provided for each dimmer 40a, 40b and 40c. For example, remote switches 88, 89 and 90 may be provided for operating the dimmer 40a; remote switches 91 and 92 may be provided for controlling the dimmer 40b; and switch 93 can be associated with dimmer 40c. Two other remote switches 94 and 95 are provided to control various groups of loads 85, 86 and 87 in a manner determined by the logic of the diode array 96.

In the arrangement shown in FIG. 4, switches 88, 89 and 90 will control only the load 85. Switches 91 and 92 will control only the load 86. Switch 93 will control only the load 87. Switch 94, however, will control all of loads 86, 86 and 87 while switch 95 will control only loads 85 and 86. It will be apparent that other logic can be employed to control various numbers of individual loads from various remote systems in any desired combination. Note also that the dimmers 40a, 40 b and 40c for loads 85, 86 and 87 can bepreset to different dimming values as determined by a lighting designer.

Also note that the use of one of the existing power lines to the dimmers 40a, 40b and 40c as a return path for the switching circuit allows on/off alternate action switching control to be achieved with only one additional wire, rather than two wires, as is normally the case.

Figures 5, 6:
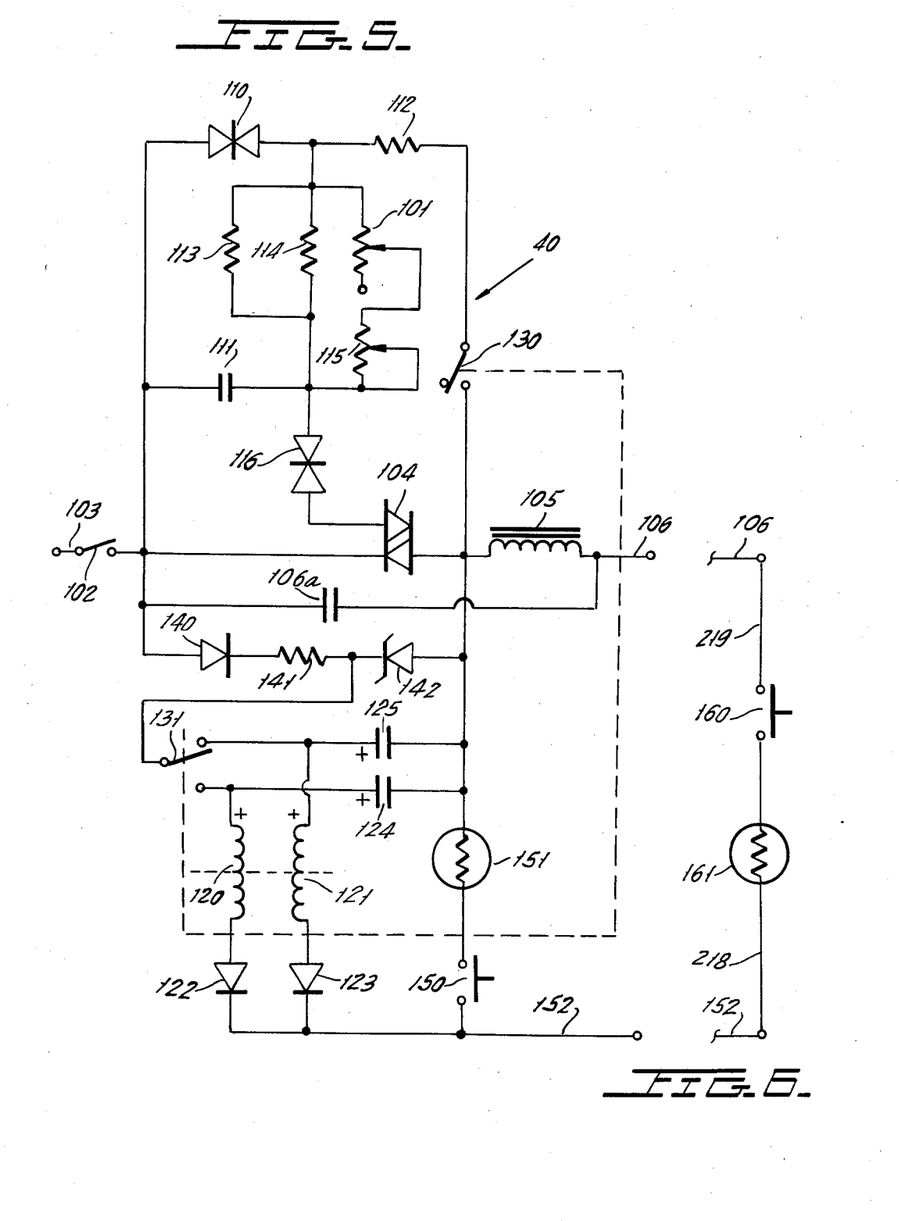
FIG. 5 is a detailed circuit diagram of a dimming switch of the present invention.
FIG. 6 is a circuit diagram of one of the remote switches which can be employed in accordance with the present invention.
Figure 7:
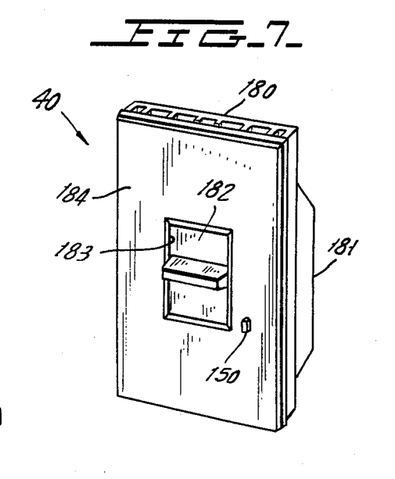
FIG. 7 is a perspective view of the front, top and side of the main dimmer switch used in connection with the present invention.
Figure 8:
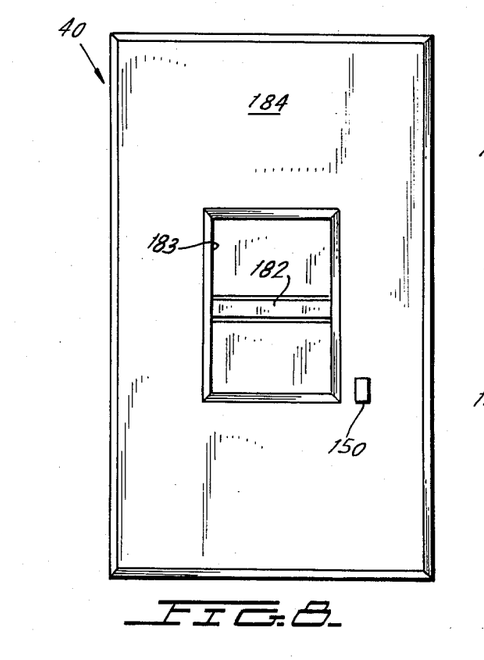
FIG. 8 is an elevation view of the front surface of the dimmer switch of FIG. 7.

FIG. 5 is a detailed circuit diagram showing the dimmer 40 in more detail for a preferred embodiment of the invention. The physical switching structure may resemble the structure and circuit of the device of U.S. Pat. No. 3,746,923, which was hereinabove described. As is shown in that patent, there is a linear slide potentiometer 101 which is movable to adjust the phase angle of the power applied to a load and, when the slide adjustment reaches the end of its travel, it operates an air gap switch 102. That same basic structure may be employed in the preferred dimmer switch of the present invention.

The air gap disconnect switch 102 is connected in series with one main lead 103 of the device and then in series with a main control triac 104 and then in series with a radio frequency interference suppression inductor 105 to a main output power lead 106. Inductor 105 operates in conjunction with capacitor 106a to form a two-pole RFI filter of well known configuration. Note that the inductor 105 reduces the rate of rise of the triac main terminal current when the device turns on.

One main electrode of triac 104 is connected to the relatively high voltage diac 110 which can, for example, be a 60 volt diac which has a negative resistance characteristic sufficient to provide a line voltage compensated reference voltage for charging capacitor 11 which is the main firing capacitor which will be later described. Diac 110 is connected in series with resistor 112 and the node between diac 110 and resistor 112 is connected to potentiometer 101, and resistors 113 and 114. Resistor 113 is a calibrating resistor which has a value, for example, from 82 kilo-ohms to 820 kilo-ohms, which is selected to compensate for other component tolerances and sets minimum light intensity on any particular unit.

The center tap of potentiometer 101 is then connected in series with adjustable resistor 115 which acts as a trimming potentiometer which is accessible to the user only by removing the face plate of the dimmer. Potentiometer 115 is a high end trim potentiometer which is used to vary the maximum light level when potentiometer 101 is set to a minimum value.

The node between capacitor 111 and trimming potentiometer 115 is then connected through the low voltage diac 116 to the gate of triac 104. The low voltage diac can, for example, be a 30 volt diac.

Capacitor 111 is the main firing capacitor and turns on the triac 104 by discharging through the diac 116 and the gate-cathode junction of the triac 104 at an appropriate instant in the phase of the voltage between the main leads 103 and 106. Potentiometer 101 varies the charging rate of capacitor 111 and, therefore, the time delay in each half cycle before capacitor 111 reaches the firing voltage of diac 116 in order to activate the triac 104. Note also that any desired controllably conductive device can replace the triac 104 without departing from the concepts of the present invention and that any desired firing circuit could also be used.

In accordance with the present invention and as will be later described, the gate control circuit of triac 104 can be interrupted by an auxiliary contact of a latching relay in order to turn off the dimmer switch while having the dimmer level set at any value in its range, and while disconnect switch 102 is closed.

The auxiliary switching circuitry of the invention consists of a electromagnetic relay having a set coil 120 and reset coil 121, each of which is connected in series with respective diodes 122 and 123. Note that these correspond identically to coils 61 and 62, respectively, of FIG. 3 and diodes 65 and 66 of FIG. 3, respectively. As in FIG. 3, charging capacitors 124 and 125 are provided for coils 120 and 121, respectively.

As shown by dotted lines, contacts 130 and 131 are both coupled to and operated by coils 120 and 121 such that the contacts are in the positions shown when set coil 120 is pulsed, and will be in the other of their positions when the reset coil 121 is pulsed. Charging current for capacitors 124 and 125 is derived from diode 140 which is connected in series with current limiting resistor 141 and zener diode 142. Note that all of diodes 122, 123 and 140 are type 1N4004. Diode 142 is a 30 volt zener diode which regulates the voltage applied to capacitors 124 and 125.

There is finally provided, for the switch 40, a push-button contact 150 which may be momentary closed contact normally biased to an open position. Contact 150 is connected in series with a positive temperature coefficient resistor 151. The positive temperature coefficient resistor 151 operates to protect the switch 150 against damage in the event of a miswired installation in which full line voltage is applied across the switch 150. This means of protection has the advantage of being automatically reset when the fault condition is removed, without any action required on the part of the operator. The cathodes of diodes 122 and 123 and the lower lead of switch 150 are then connected to the control wire 152 which corresponds to the control wire 80 in FIG. 3.

A plurality of remote control switches can then be connected between power outlet wire 106 and the control wire 152 as was shown in FIG. 3. Each of these control switches may have the structure shown in FIG. 6 of a momentary closed push-button switch 160 connected in series with the positive temperature coefficient resistor 161. Each of these remote switches is connected between leads 106 and 152 of FIG. 5.

The operation of the latching relay of FIG. 5 is as follows:

In the position shown, switch 130 is open and switch 131 is in the upper position shown. When switch 130 is open, the firing circuit for firing triac 104 is disabled and the output power to any load connected between main leads 103 and 106 is off. Note, however, that the main disconnect switch 102 is closed if the slide potentiometer 101 is in some intermediate dimming position.

In order to turn on the load, the switch 150 or any remote switch 160 connected between leads 106 and 152 is momentarily closed. This permits capacitor 125, which is charged, to discharge through the reset coil 121, diode 123, the closed switch 150 or a similar remote switch and back to the right-hand side of capacitor 125 (if switch 150 is depressed) or through the low resistance coil 105 to the right-hand side of the capacitor 125, if one of the remote switches was depressed.

The momentary pulsing of reset coil 121 will cause contacts 130 and 131 to change state so that contact 130 closes to enable the firing control circuit for triac 104 to assume control of the triac, thus turning on the load connected between leads 103 and 106. At the same time, the contact of switch 131 is connected to capacitor 124 to charge the capacitor 124, thus holding it in readiness to discharge through the set coil 120 in response to another momentary closure of any of the remote contacts of the system or of the local contact 150. Diodes 122 and 123 are needed to block the flow of charging current through the set coil 120 and reset coil 121, respectively, and simultaneously charging capacitors 124 and 125, respectively.

Note that if the adjustment potentiometer 101 is moved to one extreme end of its motion, the switch 102 is opened, thereby removing all voltage from the load and turning off the entire system.

The following resistors and capacitors were used in the circuit of FIG. 5 and were found to produce satisfactory operation for the embodiment which is disclosed in FIG. 5:

| Resistors | |
|---|---|
| 101 | 0 to 250 kilo-ohms |
| 112 | 27 kilo-ohms |
| 114 | 200 kilo-ohms |
| 115 | 0 to 100 kilo-ohms |
| 141 | 20 kilo-ohms |
| Capacitors | |
| 106a | .047 microfarads |
| 111 | .068 microfarads |
| 124 | 4.7 microfarads |
| 125 | 4.7 microfarads |

Figure 9:
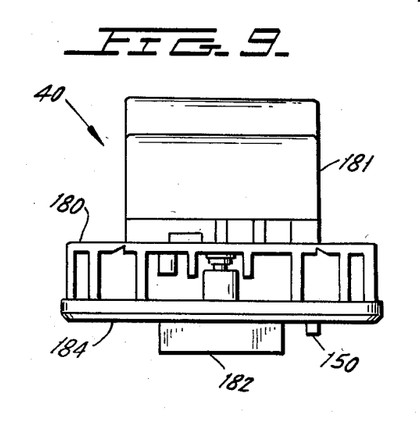
FIG. 9 is a top view of FIG. 8.
Figure 10:
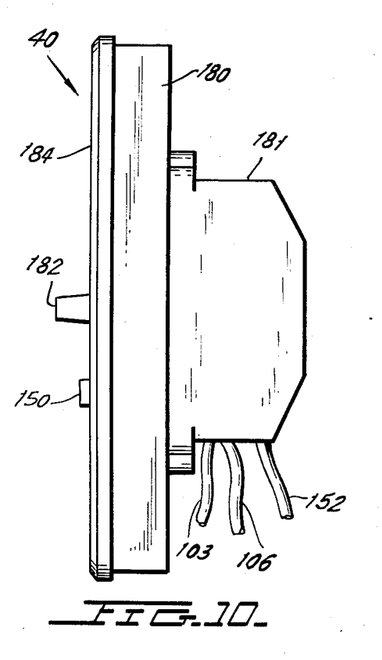
FIG. 10 is a side view of FIG. 8.
Figure 11:
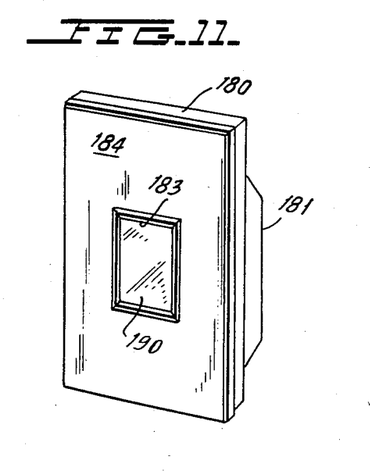
FIG. 11 is a perspective view of the front, top and side surfaces of a remote switch constructed in accordance with the present invention.
Figure 12:
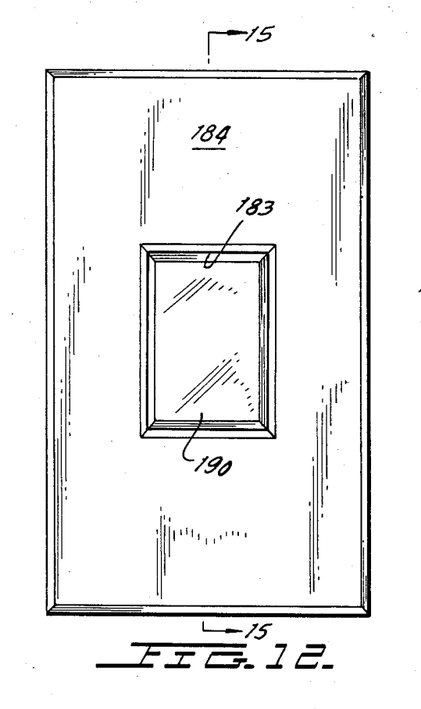
FIG. 12 is an elevational view of the front surface of the switch of FIG. 11.
Figure 13:
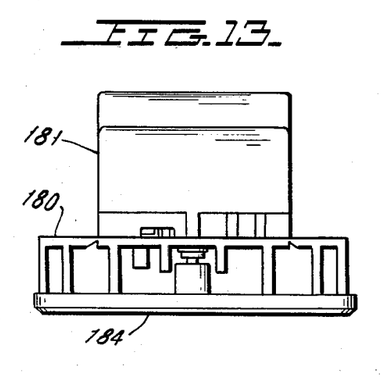
FIG. 13 is a top view of FIG. 12.
Figure 14:
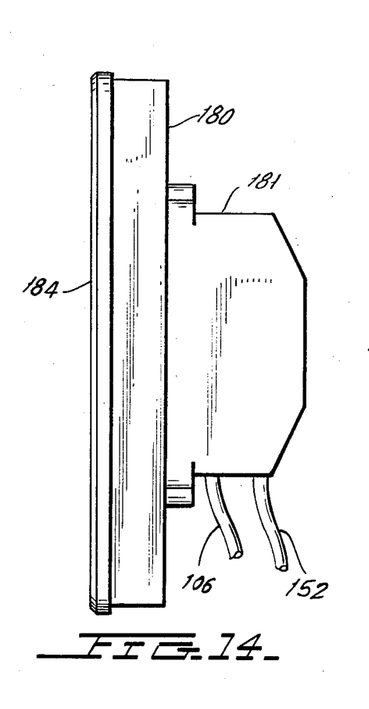
FIG. 14 is a side view of FIG. 12.

The mechanical assembly of the dimmer switch 40 of FIG. 5 is shown in FIGS. 7 to 10. The switch mechanically has a similar appearance and construction to that shown in above-referenced U.S. Pat. No. 3,746,923, in that all components are carried on a suitable finned heat sink 180 and are contained in an insulation enclosure 181 (FIGS. 9 and 10). Thus, the assembly is suitable for mounting in a wall box. The adjustable potentiometer 101 of FIG. 5 is operated by a linear slide member 182 which is movable within a wide, elongated slot 183 in an insulation cover 184 which is mounted over the heat sink 180.

In accordance with the present invention, the mechanical appearance of the wall-mounted switch of FIGS. 7 to 10 differs from that of U.S. Pat. No. 3,746,923 in that the push-button switch 150 is provided and is available for operation from the front of the face plate 184. Moreover, the latching relay structure of FIG. 5 is contained within housing 181 and is supported from plate 180. Thus, if one wanted to use the switch 140 to turn off a lamp or other load operated by the device 40, it is necessary only to momentarily press push-button switch 150 to close the switch, thus causing the operation of the magnetic latching relay or other auxiliary switching circuitry which deenergizes the triac or other controllably conductive device which connects the load to the energizing source. The position of the slider 182, however, is left in place and the air gap switch 102 remains closed.

It is possible to reenergize the load simply by depressing the push-button switch 150 or any other remote switch in the system as has been previously described in connection with FIG. 5.

The entire system can be used for remote operation with or without the momentary switch 150 in the main dimmer unit 40, although the provision of the push-button switch 150, as shown in FIGS. 7 to 10, is employed in the preferred embodiment of the invention.

The remote switches 41 to 44 of FIG. 3 can take any desired form and, in the preferred embodiment of the invention, take the form shown in FIGS. 11 through 16. While these switches must deal only with signal current, they can conveniently take the general form of a wall-mounted switch as shown. Thus, outwardly, the switches have an appearance similar to that of the main dimmer switch of FIGS. 7 to 10 and can employ the same heat sink mount 180 and face plate 184 and insulation enclosure 181 on the rear surface. However, the opening 183 in cover or face plate 184 receives a push button 190 rather than the slide 182 of FIGS. 7 to 10. Note that the metallic finned heat sink 180 is not necessary for the switch of FIGS. 11 to 16 but it is used conveniently since it is taken from the same inventory used for the main switch device.

Figures 15, 16:
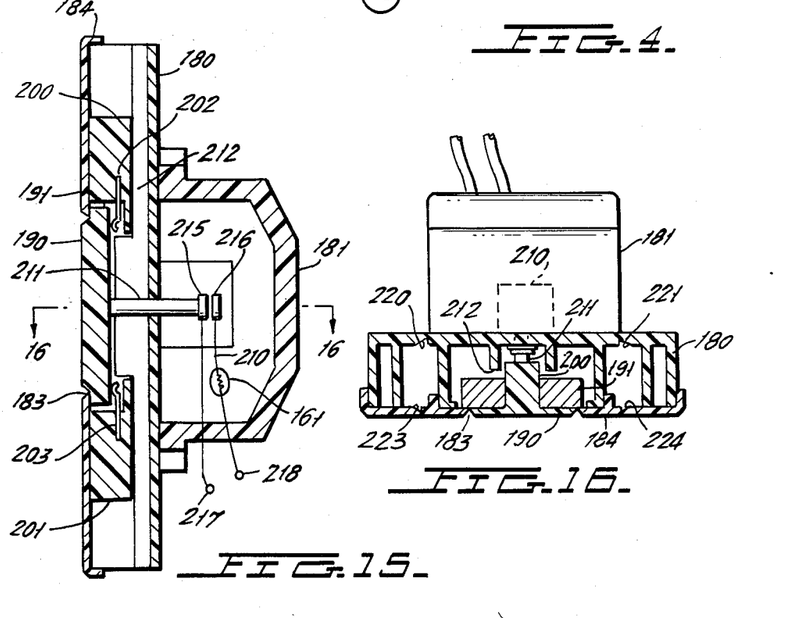
FIG. 15 is a cross-sectional view of FIG. 12 taken across the section line 15—15 in FIG. 12.
FIG. 16 is a cross-sectional view of FIG. 15 taken across the section line 16—16 in FIG. 15.

To adapt the face plate 184 for a remote switch application and as best shown in FIGS. 15 and 16, the push button 190 is provided with an enlarged annular flange 191 which abuts against the interior of opening 183 to hold the left-hand surface of push button 190 in FIGS. 15 and 16 flush with the outer surface of plate 184.

Two insulation support members 200 and 201 are appropriately secured to the inside surface of plate 184 as by cementing. Members 200 and 201 have leaf-spring members 202 and 203, respectively, secured therein which leaf springs press against the right-hand surface of push button 190 to force flange 191 toward contact with the opposing interior surface of plate 184. Thus, push button 190 is secured in position and fits closely within the opening 183 but can be depressed against the biasing force of springs 202 and 203.

Also note that annular flange 191 is relatively thick and dimensioned such that its rear surface will come into contact with the raised top section of fins 212 if sufficient force is applied to button 190. By properly dimensioning the thickness of button 190 and flange 191 as well as the height of fins 212, the small switch actuating arm 211 and contacts 210 will be protected from damage due to overtravel beyond their mechanical limits, since the button travel is forcibly stopped when the rear surface of button 190 comes into contact with fins 212. Even extremely high force levels on button 190 can easily be absorbed at this relatively large interface, and switch contacts 210 are thereby protected from abuse.

Contained within the insulation housing 181 and as shown in FIGS. 15 and 16 is a simple switching device 210 which can be a conventional microswitch which has a projecting plunger 211, the depression of which causes the internal contacts, schematically shown in FIG. 15 as contacts 215 and 216, to engage one another. This engagement takes place with relatively little axial motion of the plunger 211 (less than about 1 millimeter) and is accomplished with relatively small actuating force (of the order of several ounces). The contacts 215 and 216 are then connected to the leads 217 and 218 (FIGS. 6 and 15) which are taken through the insulation housing 181. Note that in FIG. 15 there is also schematically illustrated the positive temperature coefficient resistor 161 which is contained within the housing 181.

As a result of the novel structure shown in FIGS. 11 to 16, the remote switch can be operated by the depression of the relatively large area push-button switch operator 190. The push button in the preferred embodiment is about 1 inch in width by 1½ inches in height. It engages the plunger 211 at its center. Because of the short actuating motion needed for the shaft 211 in order to close contacts 215 and 216, an operator can press the push button 190 at any point on its exposed surface area to obtain the necessarily axial movement of plunger 211 to cause operation of the remote switch device. That is, even though the push button 190 may attempt to rotate or tilt during operation, its center will still move sufficiently to operate the plunger 211 to a contact-closed position.

Also note that the button and face plate are parts of a single subassembly, so that the face plate may be removed, as for assembly or installation purposes, and the button remains attached to the face plate, so that reassembly is very simple. Also, this reduces tolerance problems between the button and face plate location. Further, this design allows the use of a button which does not protrude above the surface of the face plate, enhancing the aesthetic appeal of the design.

It will be noted particularly in FIG. 16 that the heat sink 180 can be reduced in width by breaking it off at notches 220 and 221, for example, for gang-mounting purposes. Either one or both sides can be broken off. With both sides intact, the switch width will be about $2\frac{3}{4}$ inches and its height will be about $4\frac{1}{2}$ inches. When one side is broken off, the switch width is reduced to $2\frac{1}{4}$ inches and when both sides are broken off the switch width is reduced to $1\frac{3}{4}$ inches. The plastic cover plate 184 is also provided with similar break-off notches 222 and 223, respectively, which enables a reduction in the width of the face plate 184 by the same amount as the underlying heat sink. Note that the main switch 40 of FIGS. 7 to 10 will have the same arrangement for the heat sink and cover plate to enable different width adjustments which might be desirable for the gang-mounting of a plurality of units in a wall box of given size.

It also will be apparent that the main dimmer circuit of FIG. 6 could be housed in an enclosure as shown in FIGS. 11–16, with the light level adjustment being a small potentiometer accessible only by uncovering the face plate 184. This would be desirable when the user is to have on/off control, but access to the dimming control is to be limited, as might be the case in the energy saving switching system referred to earlier.

Although the present invention has been described in connection with preferred embodiments thereof, many variations and modifications will now become apparent to those skilled in the art. It is preferred, therefore, that the present invention be limited not by the specific disclosure herein, but only by the appended claims.

What is claimed is:

1. A dimmer switch comprising:
   first and second power leads connectable in series with a source of power and a load;
   a controllably conductive device having first and second main electrodes connected between said first and second power leads and further having a control electrode;
   control circuit means connected between at least one of said first and second main electrodes and said control electrode for applying a control signal having a maximum voltage substantially lower than the voltage of said source to said conrol electrode to cause said controllably conductive device to become conductive, and variable control means, connected to said control circuit means to variably apply said control signal to said control electrode; said variable control means including a movable adjustment member which is incrementally movable between a minimum and maximum setting to determine the magnitude of said control signal;
   first disconnect switch means locally operable between an engaged and a disengaged position, said first switch means connected in a series circuit which includes at least said controllably conductive device, said first switch means and said power leads, whereby opening said first switch means opens the electrical circuit between said conductive device and at least one of said power leads; and
   second disconnect switch means operable between an engaged and disengaged position and an operating mechanism therefor, said second switch means connected in said control circuit means and being connected between said at least one of said first and second main electrodes and said control electrode, said variable control means being independent of said first and second disconnect switch means whereby dimming settings associated with said variable control means are unaffected by changing the condition of said first and second switches and whereby operation of said second switch means to one of its said positions prevents application of said control signal to said control electrode and renders said controllably conductive device nonconductive.

2. The dimmer switch of claim 1 which further includes a support plate for supporting, adjacent one surface thereof, said controllably conductive device, said control circuit means, said first switch means and said second switch means.

3. The dimmer switch of claim 2 which further includes an insulation housing secured to said one surface of said support plate and enclosing said controllably conductive device, said control circuit means, and said first and second switch means.

4. The dimmer switch of claim 1, wherein said variable control means comprises a potentiometer having a linearly movable control slider.

5. The dimmer switch of claim 4 which further includes a support plate for supporting, adjacent one surface thereof, said controllably conductive device, said control circuit means, said first switch means and said second switch means.

6. The dimmer switch of claim 5, wherein said linearly movable control slider has an operating member; said support plate having an elongated slot therein; said operating member being movable along said slot and being operable from areas adjacent the surface of said support plate which is opposite to said one surface thereof.

7. The dimmer switch of claim 6 which further includes an insulation housing secured to said one surface of said support plate and enclosing said controllably conductive device, said control circuit means, and said first and second switch means.

8. The dimmer switch of claim 6, wherein said linearly movable slider is operatively connected to said first switch means whereby said first switch means is operated to its said disengaged position when said slider reaches one end position of its linear movement.

9. The dimmer switch of claim 8 which further includes an insulation housing secured to said one surface of said support plate and enclosing said controllably conductive device, said control circuit means, and said first and second switch means.

10. The dimmer switch of claim 2, 3, 4, 5, 6, 7, 8 or 9, wherein said operating mechanism for said second switch means comprises a latching relay and an operating switch operable for pulsing said latching relay to change the conduction condition of said second switch means; said operating switch having an operating member extending through said support plate; said operating member being operable from areas adjacent the surface of said support plate which is opposite to said one surface thereof; said operating member operating said operating switch with a short motion, low force activation input.

11. The dimmer switch of claim 10, wherein said operating switch is a momentary close push-button switch.

12. A power control system for a load which can be dimmed from at least a first location and can be switched on and off from at least a second location; said power control system comprising a dimmer switch mounted at said first location and a remote switch mounted at said second location; said dimmer switch comprising:

first and second power leads connectable in series with a source of power and a load;
a controllably conductive device having first and second main electrodes connected to said first and second power leads respectively, and further having a control electrode;
control circuit means connected between at least one of said first and second main electrodes and said control electrode for applying a control signal having a maximum voltage substantially lower than the voltage of said source to said control electrode to cause said controllably conductive device to become conductive, and variable control means connected to said control circuit means to variably apply said control signal to said control electrode;
a first air gap switch means operable between a conductive and a non-conductive condition and connected in said control circuit means and operatively connected between said at least one of said first and second main electrodes and said control electrode, whereby operation of said first switch means to one of its said conduction conditions prevents application of said control signal to said control electrode and renders said controllably conductive device non-conductive;
a relay means operatively connected to said first switch means and operable in response to a voltage applied thereto to change the state of said first switch means;
said remote switch comprising second switch means operable with short actuation distance and operable with low force and between a conductive and non-conductive condition; and
circuit means including elongated low voltage, low current wires connecting said remote switch means in circuit relation with said relay means, whereby operation of said remote switch to one of its said conduction conditions will change the conduction state of said controllably conductive device.

13. The system of claim 12 which further includes air gap disconnect switch means connected between said first and second power leads and in series with said controllably conductive device.

14. The system of claim 12, wherein said remote switch means is a low power momentary contact switch.

15. The system of claim 13, wherein said remote switch means is a low power momentary contact switch.

16. The system of claim 12 which further includes a plurality of remote switches, each identical to said remote switch and located at a respective plurality of remote locations and each coupled to said relay means.

17. A power control system for a load which can be switched on and off from at least first and second locations and which can be dimmed from said first location; said power control system comprising a switch device mounted at said first location and a remote switch mounted at said second location; said switch device comprising:

first and second power leads connectable in series with a source of power and a load;
a controllably conductive device having first and second main electrodes connected between said first and second power leads and further having a control electrode;
control circuit means connected between at least one of said first and second main electrodes and said control electrode for applyiing a control signal having a maximum voltage substantially lower than the voltage of said source to said control electrode to cause said controllably conductive device to become conductive, and control means connected to said control circuit means to apply said control signal to said control electrode;
first air gap disconnect switch means locally operable between an engaged and disengaged position, said first switch means connected in a series circuit which includes at least said controllably conductive device, said first switch means and said power leads, whereby opening said first switch means opens the electrical circuit between said conductive device and at least one of said power leads;
second air gap disconnect switch means operable between an engaged and a disengaged position, said second switch connected in said control circuit means and being connected between said at least one of said first and second main electrodes and said control electrode, whereby operation of said second switch means to one of its said positions prevents application of said control signal to said control electrode and renders said controllably conductive device non-conductive;
operating means connected to said second switch means for changing the state of said second switch means between its engaged and disengaged positions in response to energization of said operating means;
a third air gap disconnect switch means and a remote air gap switch means located at said first and second locations, respectively, and operable between respective conductive and non-conductive conditions; and
circuit means including elongated low voltage wires connecting said third switch means and said remote switch means to said operating means, whereby closure of either said third switch means or said remote switch means causes the energization of said operating means to change the state of said second switch means.

18. The system of claim 17, wherein said third switch means and said remote switch means are both low power momentary contact switches.

19. The system of claim 17 which further includes a plurality of remote switches, each identical to said remote switch means and located at a respective plurality of remote locations and each coupled to said operating means.

20. The system of claim 12 or 17, wherein said control means comprises a potentiometer having a linearly movable slider, and wherein said third switch means and said remote switch means each comprise momentary contact pushbutton switches.

21. A switching device comprising:
first and second power leads connectable in series with a source of power and a load;
a controllably conductive device having first and second main electrodes connected to said first and second power leads respectively, and further having a control electrode;
control circuit means connected between at least one of said first and second main electrodes and said control electrode for applying a control signal having a maximum voltage substantially lower than the voltage of said source to said control electrode to cause said controllably conductive device to become conductive, and variable control means connected to said control circuit means to variably apply said control signal to said control electrode; said variable control means including a movable adjustment member which is incrementally movable between a minimum and maximum setting to determine the magnitude of said control signal and switch means operable between a conductive and a non-conductive condition and an operating means therefor, said switch means connected in said control circuit means and being connected between said at least one of said first and second main electrodes and said control electrode, said variable control means being independent of said switch means whereby operation of said switch means to one of its said conditions prevents application of said control signal to said control electrode and renders said controllably conductive device non-conductive without altering a dimming setting associated with said device.

22. The switching device of claim 21, wherein said variable control means comprises a potentiometer having a linearly movable control slider.

23. The switching device of claim 22 which further includes a support plate for supporting, adjacent one surface thereof, said controllably conductive device, said control circuit means and said switch means.

24. The switching device of claim 23, wherein said linearly movable control slider has an operating member; said support plate having an elongated slot therein; said operating member being movable along said slot and being operable from areas adjacent the surface of said support plate which is opposite to said one surface thereof.

25. A power control system for a load which can be switched on and off from at least first and second locations; said power control system comprising a master switch mounted at said first location and a remote switch mounted at said second location; said master switch comprising:
first and second power leads connectable in series with a source of power and a load;
a controllably conductive device having first and second main electrodes connected to said first and second power leads respectively, and further having a control electrode;
control circuit means connected between at least one of said first and second main electrodes and said control electrode for applying a control signal having a maximum voltage substantially lower than the voltage of said source to said control electrode to cause said controllably conductive device to become conductive;
first switch means operable between a conductive and a non-conductive condition, said first switch means connected in said control circuit means and being connected between said at least one of said first and second main electrodes and said control electrode, whereby operation of said first switch means to one of its said conditions prevents application of said control signal to said control electrode and renders said controllably conductive device non-conductive;
operating means connected to said first switch means for changing the conduction state of said first switch means in response to energization of said operating means;
a second switch means and a remote switch means located at said first and second locations, respectively, and operable between respective conductive and non-conductive conditions; and
circuit means including elongated low voltage wires connecting said second switch means and said remote switch means to said operating means, whereby closure of either said second switch means or said remote switch means causes the energization of said operating means to change the state of said first switch means.

26. The system of claim 25, wherein said second switch means and said remote switch means are both low power momentary contact switches.

27. The system of claim 25 which further includes a plurality of remote switches, each identical to said remote switch means and located at a respective plurality of remote locations and each coupled to said operating means.

* * * * *